(12) United States Patent
Su et al.

(10) Patent No.: US 10,189,543 B2
(45) Date of Patent: Jan. 29, 2019

(54) ELECTRIC MOTORCYCLE WITH IMPROVED MOTOR PERFORMANCE

(71) Applicants: Kuo-Hsin Su, New Taipei (TW); Ta-Yu Su, New Taipei (TW)

(72) Inventors: Kuo-Hsin Su, New Taipei (TW); Ta-Yu Su, New Taipei (TW)

( * ) Notice: Subject to any disclaimer, the term of this patent is extended or adjusted under 35 U.S.C. 154(b) by 156 days.

(21) Appl. No.: 15/227,063

(22) Filed: Aug. 3, 2016

(65) Prior Publication Data

US 2018/0037298 A1   Feb. 8, 2018

(51) Int. Cl.
| | |
|---|---|
| *B62M 25/06* | (2006.01) |
| *B60K 1/04* | (2006.01) |
| *B62K 11/04* | (2006.01) |
| *B60L 1/00* | (2006.01) |
| *B62M 11/06* | (2006.01) |
| *B60L 11/18* | (2006.01) |
| *B60L 15/20* | (2006.01) |
| *B62M 25/00* | (2006.01) |

(52) U.S. Cl.
CPC ............... *B62M 25/06* (2013.01); *B60K 1/04* (2013.01); *B60L 1/00* (2013.01); *B60L 11/18* (2013.01); *B60L 15/20* (2013.01); *B60L 15/2054* (2013.01); *B62K 11/04* (2013.01); *B62M 11/06* (2013.01); *B60L 2200/12* (2013.01); *B60L 2240/12* (2013.01); *B60L 2240/14* (2013.01); *B60L 2240/421* (2013.01); *B60L 2240/486* (2013.01); *B60L 2240/507* (2013.01); *B60L 2250/16* (2013.01); *B62K 2204/00* (2013.01); *B62M 2025/006* (2013.01)

(58) Field of Classification Search
CPC . B60L 1/00; B60K 1/04; B62K 11/04; B62M 9/10; B62M 25/06
USPC ........................................................ 180/220
See application file for complete search history.

(56) References Cited

U.S. PATENT DOCUMENTS

| | | | |
|---|---|---|---|
| 2005/0250414 A1* | 11/2005 | Leonov .................. | A63H 17/22 17/22 |
| 2007/0219696 A1* | 9/2007 | Miller ............... | F16H 61/66259 701/51 |
| 2014/0299400 A1* | 10/2014 | Lawson ................. | B62M 23/00 180/224 |

* cited by examiner

*Primary Examiner* — Joseph M Rocca
*Assistant Examiner* — Felicia L. Brittman
(74) *Attorney, Agent, or Firm* — Rosenberg, Klein & Lee (57) ABSTRACT

An electric motorcycle includes an electric motor, a motor controller for controlling the operation of the electric motor, a gearbox that can be of a used or new fuel engine-based vehicle and rotatable by the electric motor, and a main drive shaft coupled between the electric motor and the gearbox. Subject to the optimal power transmission performance of the gearbox, the electric motor is capable of producing the most appropriate driving speed in the starting state or any of a variety of travelling states, achieving optimal output efficiency and significantly reducing power consumption and enhancing endurance.

6 Claims, 8 Drawing Sheets

PRIOR ART

FIG. 8

PRIOR ART

FIG. 9

ELECTRIC MOTORCYCLE WITH IMPROVED MOTOR PERFORMANCE

BACKGROUND OF THE INVENTION

1. Field of the Invention

The present invention relates to motorcycle technology and more particularly, to an electric motorcycle, which directly uses a gearbox of a used or new fuel engine-based vehicle for power transmission, and an electric motor for driving the gearbox so that, subject to the optimal power transmission performance of the gearbox, the electric motor is capable of producing the most appropriate driving speed in the starting state or any of a variety of travelling state, achieving optimal output efficiency and significantly reducing power consumption and enhancing endurance.

2. Description of the Related Art

Conventional electric cars are unable to replace fuel vehicles in market sales due to the performance of electric vehicles is still unable to meet the practical needs of consumers and the drawbacks of lack of endurance, long charging time, starting torque shortage and high cost The fastest and effective way is to change the drive mode of the motor. The drive modes of currently commercial electric vehicles can be divided into: (1) direct drive, (2) a reduction gear drive, and (3) belt type CVT (continuously variable transmission) drive.

(1) Direct drive: This drive mode is widely used in electric vehicles for the advantages of simple structure, no complex transmission system and low-cost, however, this mode shows the largest drop in the actual use. When a low horsepower motor is used, it consumes less electricity, and can easily be controlled during the period from startup to low speed. However, in the actual situation of urban driving, the electric vehicle must be frequently stopped and driven to move forwards. Due to the use of low horsepower motor, the start time is relatively prolonged, and the motor will draw a large amount of battery power from the battery in the initial stage in order to overcome inertia. During this period, the gear shift position cannot be changed to increase torque output, reducing the cruising range of the electric vehicle. Increasing the horsepower of the motor can improve the aforesaid problem; however, it will also increase electricity consumption and the risk of red burst in the vehicle initial stage, making the driver difficult to manipulate normal driving.

(2) Reduction gear drive: This mode improves the performance during the stage from startup to low speed by using a high-speed motor to match a reduction gear; however, due to the limitation of fixed gear ration, this drive mode cannot meet high-speed and low-speed driving needs at the same time (when an electric vehicle is running at a high speed, the driver can simply increase the rotating speed of the motor, however, increasing the rotating speed of the motor will simultaneously produce high temperature, increasing electricity consumption and significantly reducing the cruising range of electric vehicle).

(3) Belt type CVT drive: This mode uses two V-grooved turntables to clamp a transmission belt therebetween, and changes the centrifugal force of the V-grooved turntables by changing the rotating speed of the motor; further the expected reduction ratio can be achieved by changing the diameter ratio between the V-grooved turntables. However, in order to prevent relative sliding between the transmission belt and the V-grooved turntables, the V-grooved turntables must clamp the transmission belt therebetween positively, however, keeping the V-grooved turntables to clamp the transmission belt positively will produce high frictional heat, resulting in substantial energy loss and reducing the cruising range of electric vehicle.

Figure 8:
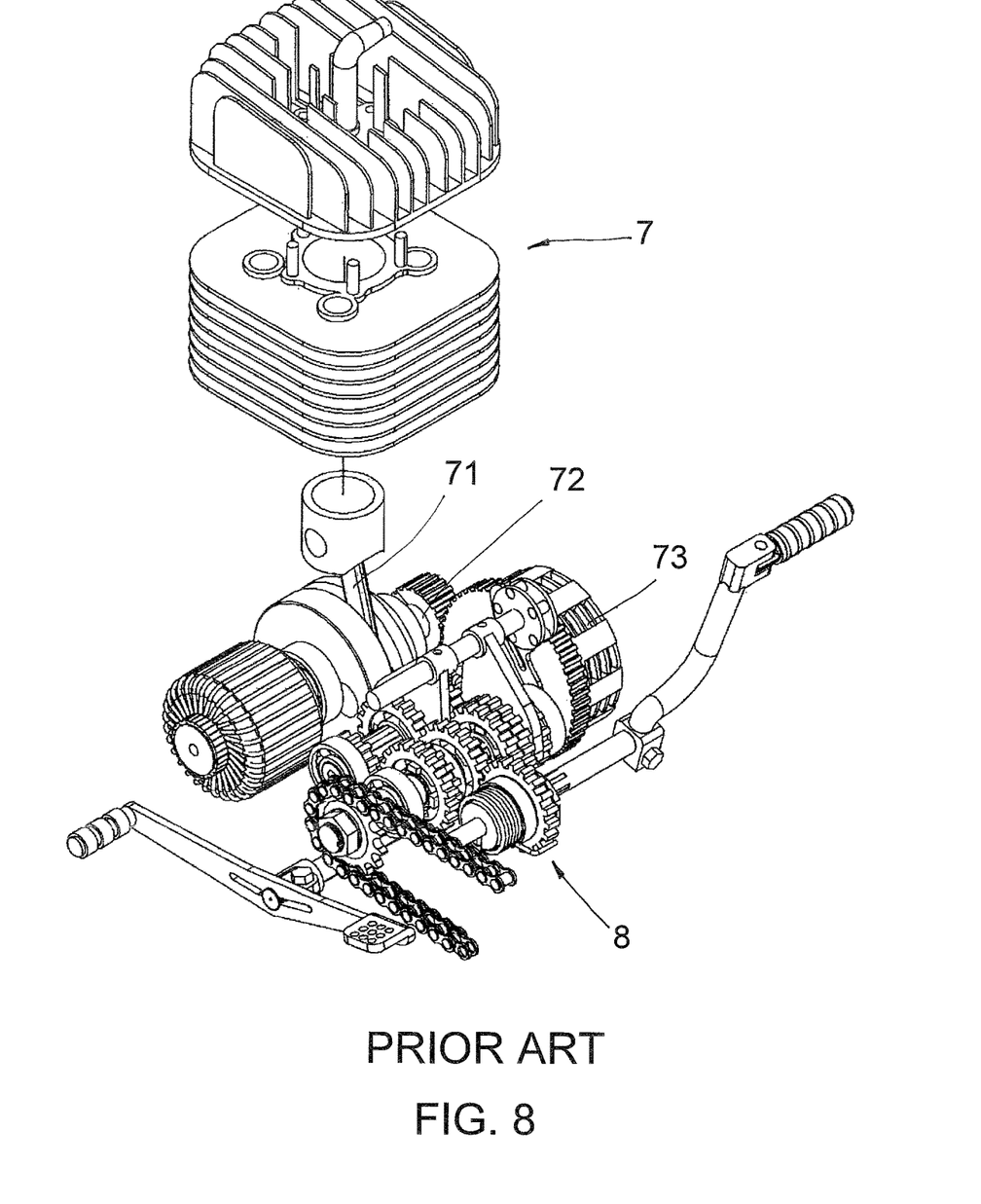
FIG. 8 is an exploded view of a fuel engine power transmission system according to the prior art.
Figure 9:
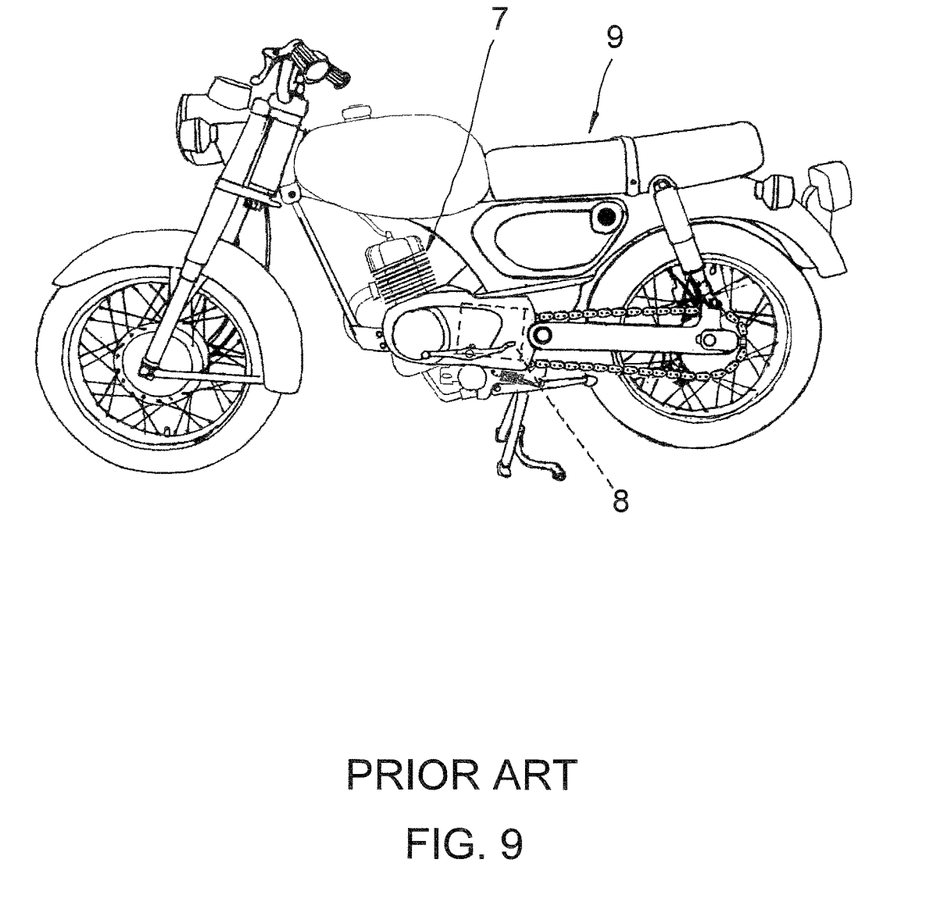
FIG. 9 is a side view of a motorcycle based on the fuel engine power transmission system shown in FIG. 8.

Further, in a fuel engine vehicle, as shown in FIGS. 8 and 9, a clutch 73 and a gearbox 8 are used to mate with a cylinder 7, a crank 71 and a crank shaft 72 for achieving an optimal driving effect and reducing fuel consumption. However, the fuel engine exhausts bad gases, causing air pollution.

Therefore, it is desirable to provide measures that eliminates emissions of pollutants, enhances motor performance, minimizes energy consumption and enhances endurance.

SUMMARY OF THE INVENTION

The present invention has been accomplished under the circumstances in view. It is the main object of the invention to provide an electric motor motorcycle, which can obtain different torque outputs when travelling in different road conditions such as uphill, downhill, etc. so that when the electric motorcycle is traveling at a low speed or high speed in different road conditions, different reduction ratio of different gear shift positions is selectively provided, maintaining optimal output efficiency of the electric motor and significantly reducing power consumption and enhancing endurance.

It is the main object of the invention to provide an electric motorcycle, which directly uses a gearbox of a used or new fuel engine-based vehicle for power transmission, and an electric motor for driving the gearbox, i.e., subject to the optimal power transmission performance of the gearbox, the electric motor is capable of producing the most appropriate driving speed in the starting state or any of a variety of travelling state, achieving optimal output efficiency and significantly reducing power consumption and enhancing endurance. Because the electric motorcycle eliminates blasting component parts such as piston, crank, crank shaft, cylinder, generator, exhaust pipe and carburetor, the cost is significantly reduced.

To achieve these and other objects of the present invention, an electric motorcycle comprises a power transmission system that comprises an electric motor, a motor controller for controlling the operation of the electric motor, a gearbox, and a main drive shaft coupled between the electric motor and the gearbox. The gearbox can be of a used or new fuel engine-based vehicle. The main drive shaft has one end thereof fixedly mounted with a belt gear and coupled to the electric motor through a transmission belt, and an opposite end thereof fixedly mounted with a main drive gear. The gearbox comprises a power input gear located at a power input end thereof and meshed with the main drive gear, a speed change gear set, a clutch coupled between the power input gear and the speed change gear set for controlling the rotating speed of the power input gear and the linking between the power input gear and the speed change gear set. The speed change gear set comprises a tachometer output sprocket located at an opposing output end thereof for driving a rear wheel of the electric motorcycle to rotate. The power transmission system further comprises a pitch shifting pedal for controlling the desired gear shift position, and a clutch lever mounted on a handlebar of the electric motorcycle for moving the clutch between a connected position and a disconnected position. When starting the electric motor, operate the clutch lever to disconnect the clutch, and then operate the pitch shifting pedal to shift the speed change gear set of the gearbox into the neutral position, and then rotate the speed twist grip to start up the electric motor, avoiding initiating an instant huge current draw. When the electric motorcycle is traveling at a low speed or high speed in different road conditions, different reduction ratio of different gear shift positions is selectively provided, maintaining optimal output efficiency of the electric motor and significantly reducing power consumption and enhancing endurance.

Other advantages and features of the present invention will be fully understood by reference to the following specification in conjunction with the accompanying drawings, in which like reference signs denote like components of structure.

DETAILED DESCRIPTION OF THE INVENTION

Referring to FIGS. 1-6, an electric motorcycle with improved motor performance in accordance with a first embodiment of the present invention is shown. The power transmission system of the electric motorcycle directly uses a gearbox 8 of a used or new fuel engine-based vehicle 9 for power transmission, and an electric motor 1 for driving the gearbox 4, i.e., subject to the optimal power transmission performance of the gearbox 8, the electric motor 1 is capable of producing the most appropriate driving speed in the starting state or any of a variety of travelling state, achieving optimal output efficiency and significantly reducing power consumption and enhancing endurance. The electric motorcycle 6 comprises an electric motor 1, a motor controller 11 and a gearbox 4. The invention removes the cylinder 7, crank 71 and crank shaft 72 of the original fuel engine, and uses a main drive shaft 3 to substitute for the crank 71 and the crank shaft 72. The main drive shaft 3 is disposed at a front side relative to the gearbox 4, having one end thereof fixedly mounted with a belt gear 31 and coupled to the electric motor 1 through a transmission belt 2, and an opposite end thereof fixedly mounted with a main drive gear 32. The main drive gear 32 is meshed with a power input gear 41 at a power input end of the gearbox 4. Further, a sprocket and chain may be used to substitute for the belt gear 31 and the transmission belt 2. Further, a clutch 43 is coupled between the power input gear 41 and a speed change gear set 42 of the gearbox 4 for controlling the rotating speed to be inputted into the power input gear 41 and the linking between the power input gear 41 and the speed change gear set 42. Further, a pitch shifting pedal 5 is provided for controlling the desired gear shift position. The speed change gear set 42 comprises a tachometer output sprocket 421 at an opposing output end thereof for driving the rear wheel 62 of the vehicle, i.e., electric motorcycle 6 to move. When starting the electric motor 6, operate the clutch lever 61 to disconnect the clutch 43, and then operate the pitch shifting pedal 5 to shift the speed change gear set 42 of the gearbox 4 into the neutral position, and then rotate the speed twist grip 64 to start up the electric motor 1, avoiding initiating an instant huge current draw. Thereafter, operate the pitch shifting pedal 5 to move the shifting axle 51 in changing the gear shift position and mating with the clutch 43, providing different torque output as the electric motorcycle 6 is travelling in different road conditions such as uphill, downhill, etc. Thus, when the electric motorcycle 6 is traveling at a low speed or high speed in different road conditions, different reduction ratio of different gear shift positions is selectively provided, maintaining optimal output efficiency of the electric motor 1 and significantly reducing power consumption and enhancing endurance.

Further, the motor controller 11 is adapted to detect the load of the electric motor 1, to control the power output of the battery 12 according to the load of the electric motor 1, and to provide the data of the load, rotating speed of the electric motor 1 and the power volume of the battery 12 to the speedometer and tachometer 63 of the electric motorcycle 6 for enabling the rider to known.

Figure 1:
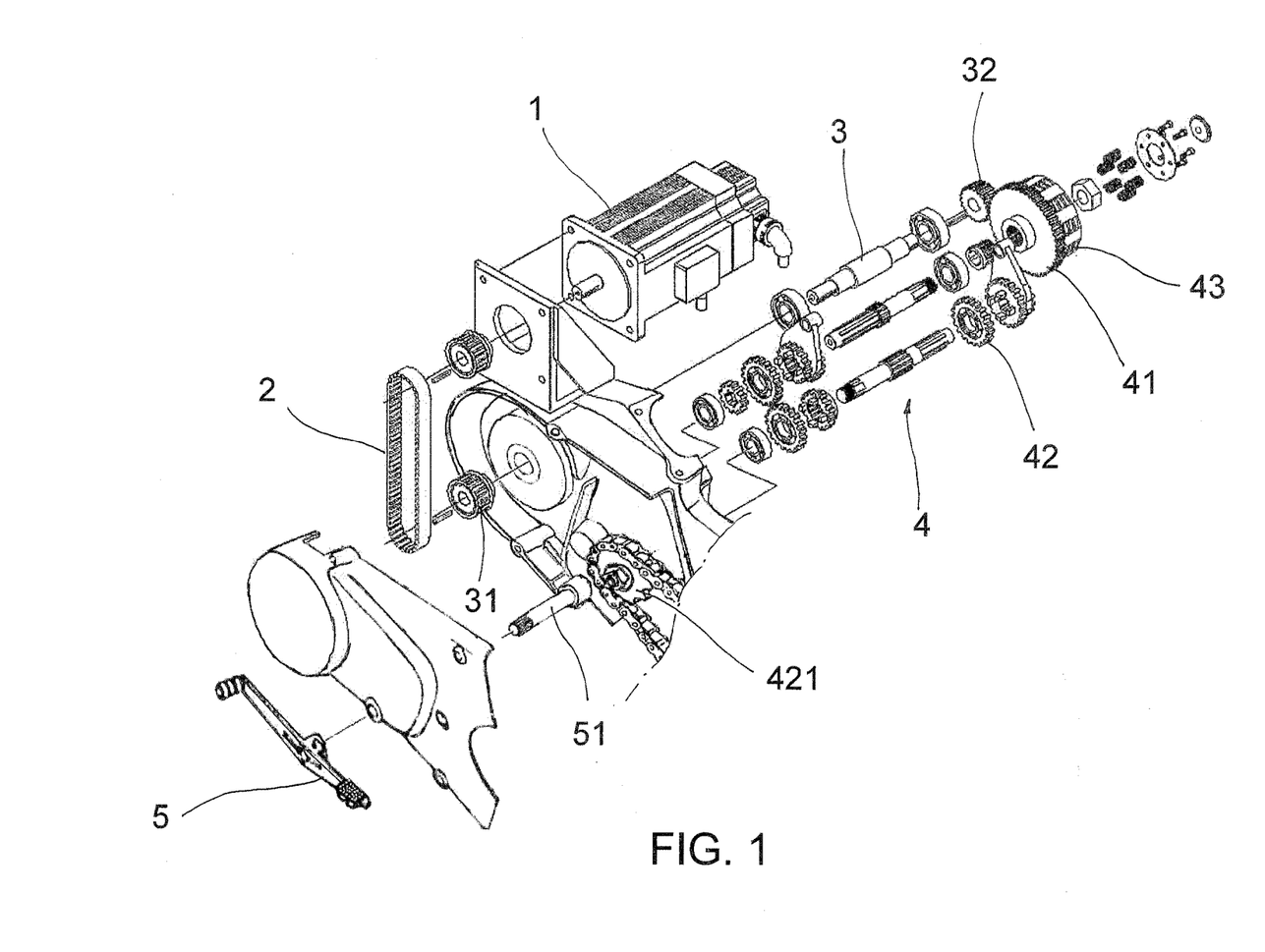
FIG. 1 is an exploded view of a power transmission system for electric motorcycle in accordance with the present invention.
Figure 2:
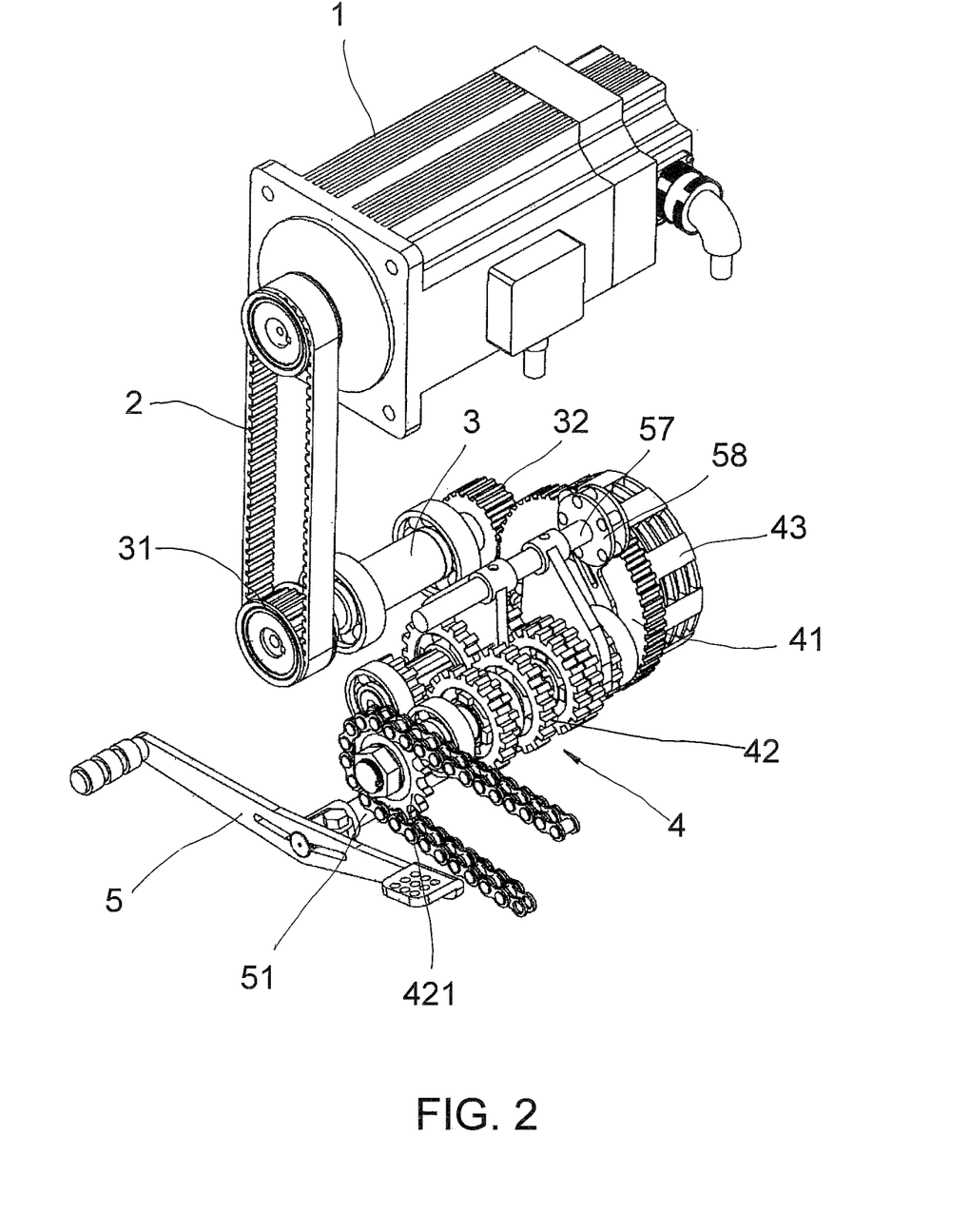
FIG. 2 is an elevational assembly view of the power transmission system of the electric motorcycle shown in FIG. 1.
Figure 3:
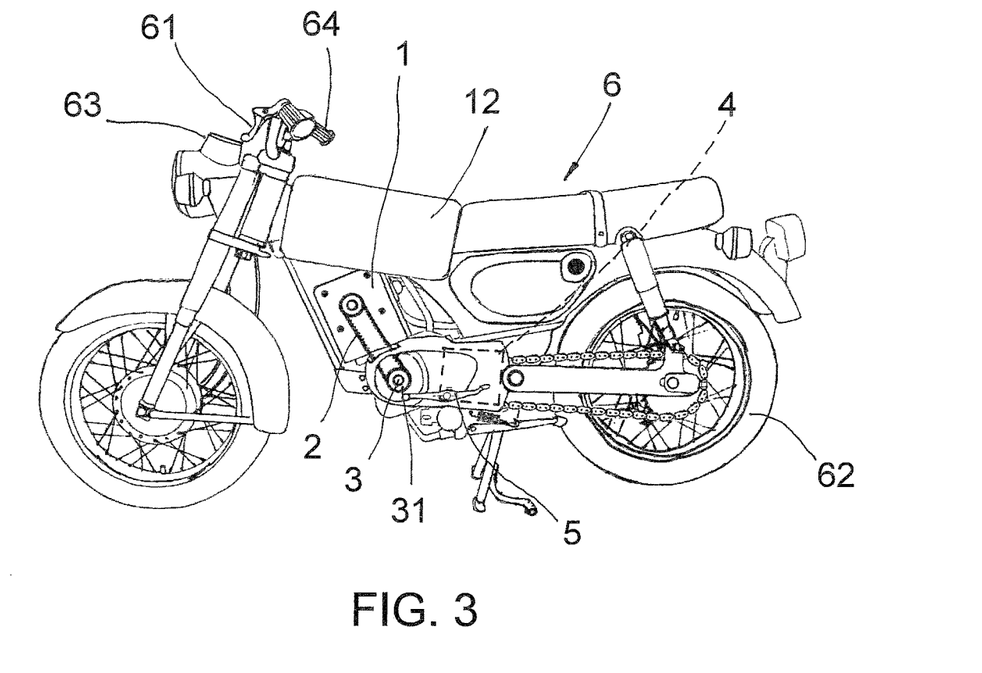
FIG. 3 is a side view of an electric motorcycle embodying the present invention.
Figure 4:
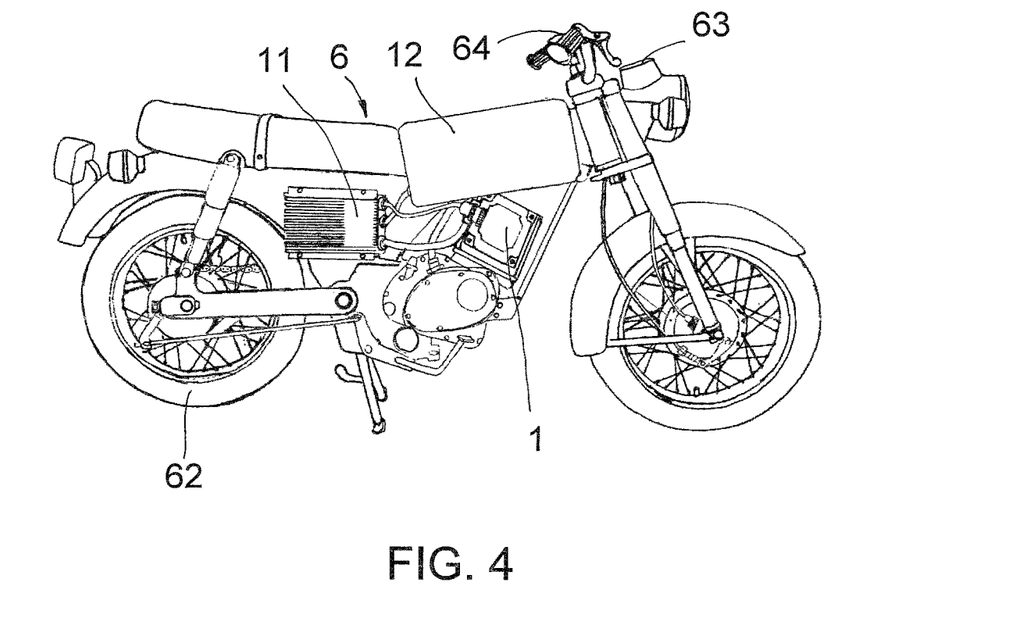
FIG. 4 corresponds to FIG. 3 when viewed from an opposite side.
Figure 5:
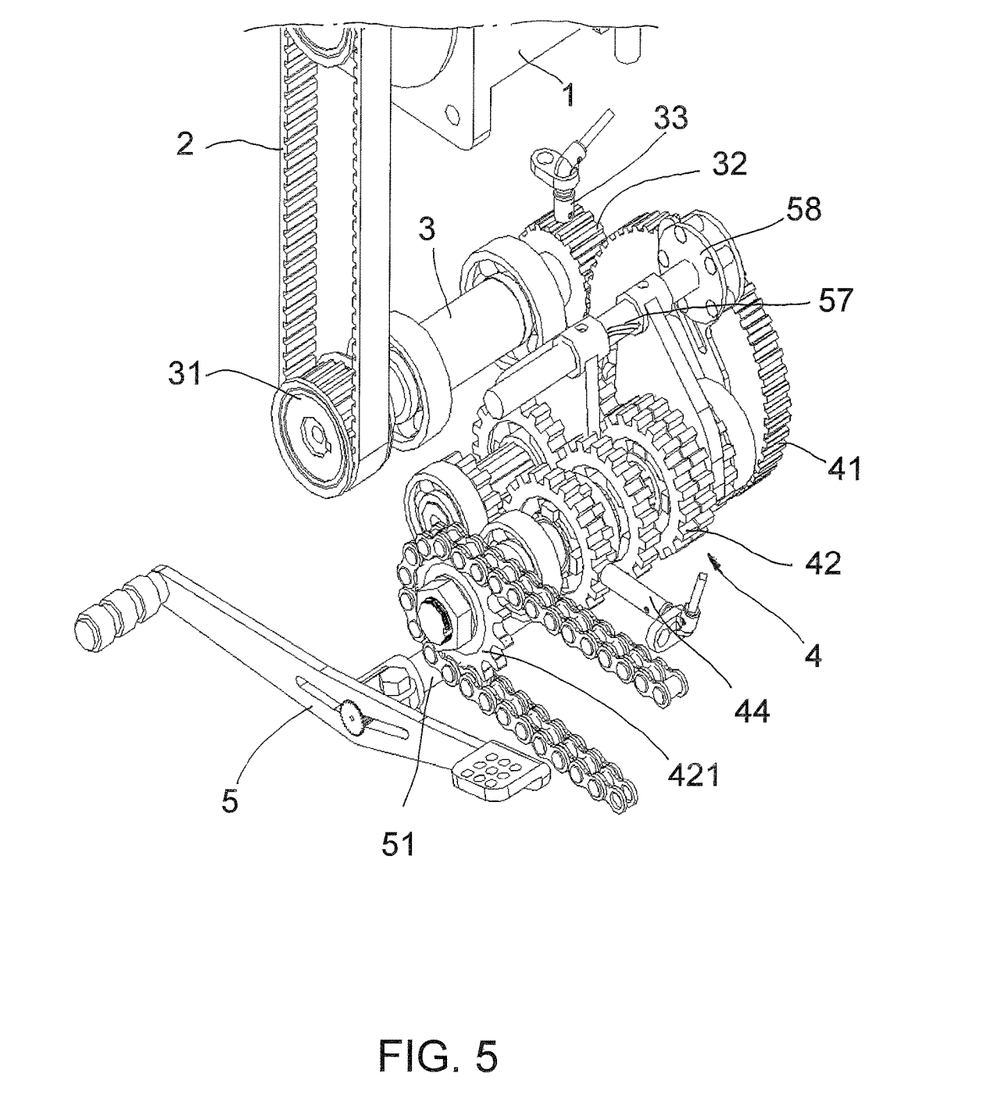
FIG. 5 is an elevational view of an alternate form of the power transmission system for electric motorcycle in accordance with the present invention.

Referring to FIG. 5, in an alternate form of the present invention, in order to avoid flameout of the electric motorcycle 6 when entering from the neutral position to a gear shift position, this embodiment eliminates the aforesaid clutch 43, and provides a motor speed sensor 33 and a vehicle speed sensor 44. The motor speed sensor 33 can be mounted on the main drive gear 32 of the main drive shaft 3 for synchronization with the electric motor 1, or a component part that is synchronized with the electric motor 1, and adapted for obtaining the data of the rotating speed of the electric motor 1. The vehicle speed sensor 44 is disposed at one side of one gear of the speed change gear set 42 that is synchronized with the tachometer output sprocket 421, and adapted for obtaining the data of the traveling speed of the electric motorcycle 6. The data of the rotating speed of the electric motor 1 and the data of the traveling speed of the electric motorcycle 6 are provided to the speedometer and tachometer 63 so that the rider can know the traveling speed of the electric motorcycle 6 and the rotating speed of the electric motor 1 from the speedometer and tachometer 63, and then rotates the speed twist grip 64 to change the rotating speed of the electric motor 1 properly. By means of the pitch shifting pedal 5 at one side of the gearbox 4, the rider can shift the gear shift position conveniently.

Figure 6:
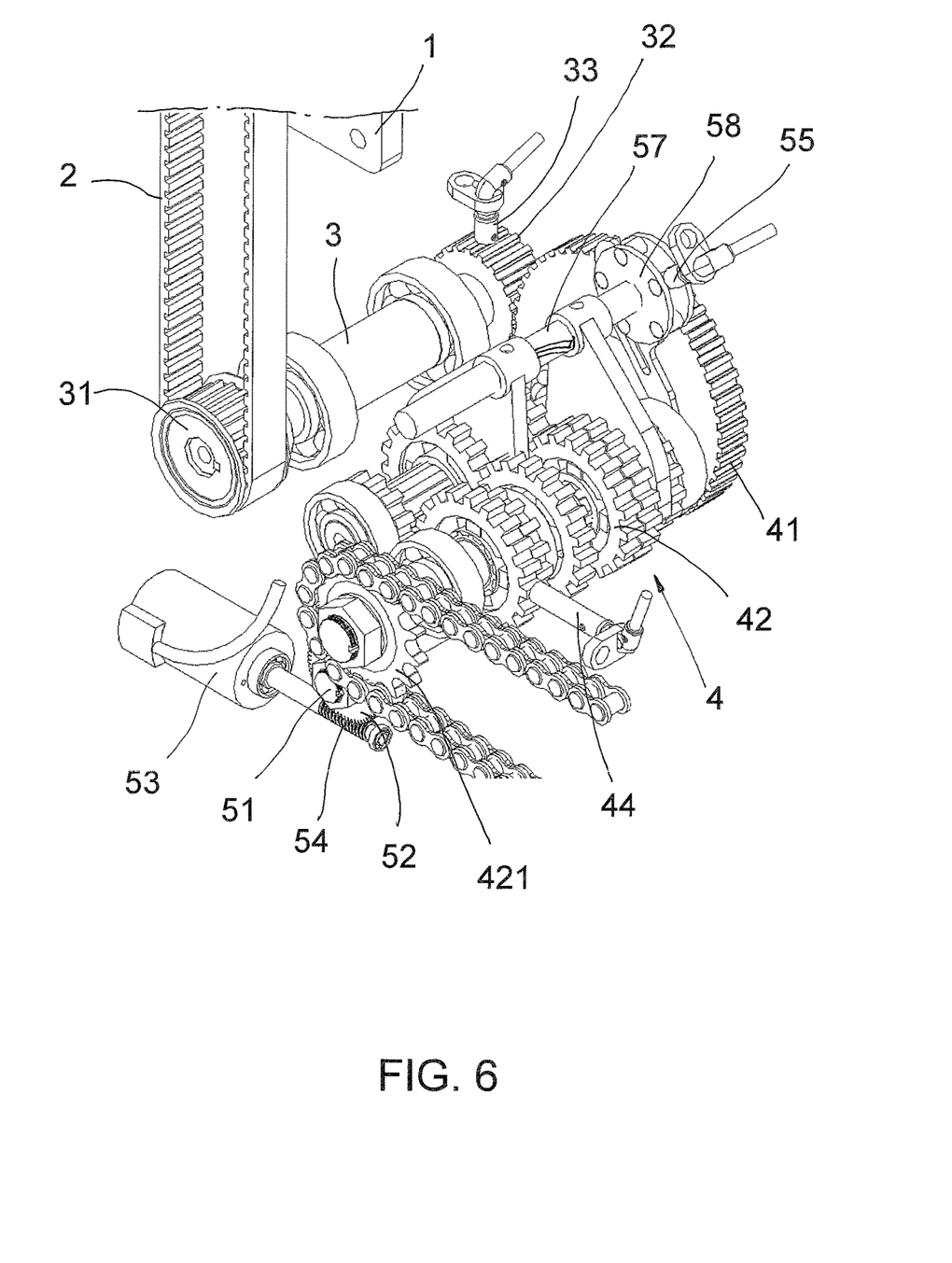
FIG. 6 is an elevational view of another alternate form of the power transmission system for electric motorcycle in accordance with the present invention.
Figure 7:
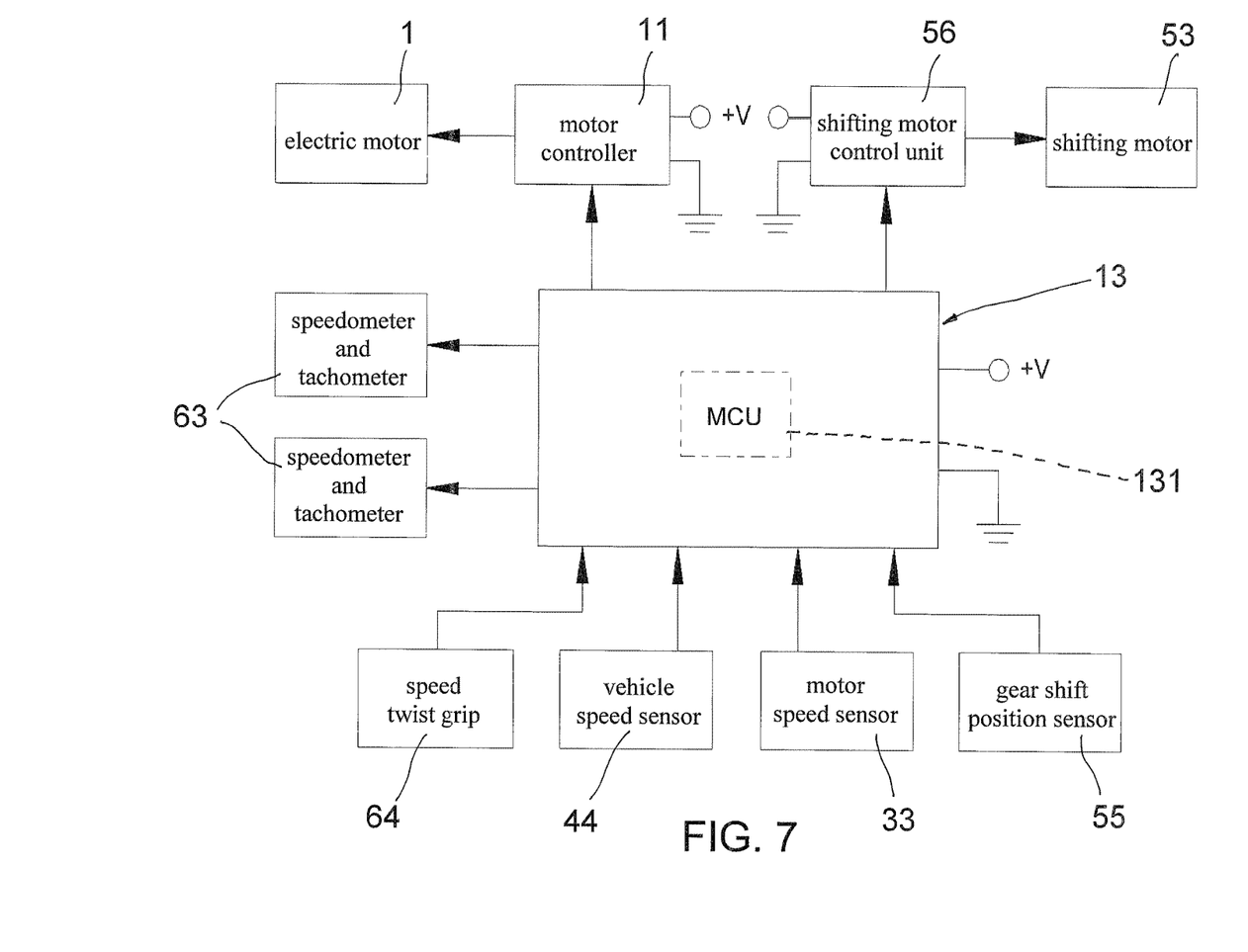
FIG. 7 is a control circuit block diagram of the power transmission system shown in FIG. 6.

Referring to FIGS. 6 and 7, in an alternate form of the present invention, in order to avoid flameout of the electric motorcycle 6 when entering from the neutral position to a gear shift position, this embodiment eliminates the clutch 43, provides a motor speed sensor 33, a vehicle speed sensor 44, a control unit 13 and a gear shift position sensor 55. The motor speed sensor 33 can be mounted on the main drive gear 32 of the main drive shaft 3 for synchronization with the electric motor 1, or a component part that is synchronized with the electric motor 1, and adapted for obtaining the data of the rotating speed of the electric motor 1. The vehicle speed sensor 44 is disposed at one side of one gear of the speed change gear set 42 that is synchronized with the tachometer output sprocket 421, and adapted for obtaining the data of the traveling speed of the electric motorcycle 6. The control unit 13 comprises a MCU 131 electrically coupled with the motor speed sensor 33 and the vehicle speed sensor 44 and adapted for converting the data of the rotating speed of the electric motor 1 and the data of the traveling speed of the electric motorcycle 6 and driving the speedometer and tachometer 63 to display the converted data. The gear shift position sensor 55 is mounted in a gear shifting mechanism for detecting the position of a gear shift position dial switch 58 of a fork shaft 57 to obtain the data of the gear shift position. The data of the gear shift position detected by the gear shift position sensor 55, the data of the turning degree of the speed twist grip 64, the data of the rotating speed of the electric motor 1 detected by the motor speed sensor 33 and the data of the traveling speed of the electric motorcycle 6 detected by the vehicle speed sensor 44 are provided to the MCU 131 of the control unit 13 for computing so that the MCU 131 can provide an appropriate control signal to the motor controller 11 for regulating the rotating speed of the electric motor 1 to rotate the gearbox 4 synchronously. At the same time, the MCU 131 provides a control signal to a shifting motor control unit 56 to drive a shifting motor 53 that is coupled with the shifting axle 51 through a worm 54 at the shifting motor 53 and a worm wheel 52 at the shifting axle 51. Thus, the shifting axle 51 can be rotated to shift the gear shift position automatically.

In conclusion, the invention enables the electric motor vehicle (electric motorcycle) to obtain different torque outputs when travelling in different road conditions such as uphill, downhill, etc. so that when the electric motor vehicle (electric motorcycle) is traveling at a low speed or high speed in different road conditions, different reduction ratio of different gear shift positions is selectively provided, maintaining optimal output efficiency of the electric motor and significantly reducing power consumption and enhancing endurance.

What the invention claimed is:

1. An electric motorcycle, comprising a power transmission system, said power transmission system comprising an electric motor, a motor controller adapted for controlling the operation of said electric motor, a gearbox, and a main drive shaft coupled between said electric motor and said gearbox, wherein said main drive shaft has one end thereof fixedly mounted with a belt gear and coupled to said electric motor through a transmission belt, and an opposite end thereof fixedly mounted with a main drive gear; said gearbox comprising a power input gear located at a power input end thereof and meshed with said main drive gear, a speed change gear set, a clutch coupled between said power input gear and said speed change gear set for controlling the rotating speed of said power input gear and the linking between said power input gear and said speed change gear set, said speed change gear set comprising a tachometer output sprocket located at an opposing output end thereof for driving a rear wheel of the electric motorcycle to rotate; the power transmission system further comprises a pitch shifting pedal for controlling the desired gear shift position, and a clutch lever mounted on a handlebar of the electric motorcycle for moving said clutch between a connected position and a disconnected position.

2. The electric motorcycle as claimed in claim 1, further comprising a battery for providing electricity to said electric motor and a speedometer and tachometer for respectively indicating the traveling speed of the electric motorcycle and the rotating speed of said electric motor, wherein said motor controller is adapted for detecting the load of said electric motor and the power volume of said battery and displaying the detected data through said speedometer and tachometer.

3. An electric motorcycle, comprising a power transmission system, said power transmission system comprising an electric motor, a motor controller adapted for controlling the operation of said electric motor, a gearbox, and a main drive shaft coupled between said electric motor and said gearbox, wherein said main drive shaft has one end thereof fixedly mounted with a belt gear and coupled to said electric motor through a transmission belt, and an opposite end thereof fixedly mounted with a main drive gear; said gearbox comprising a power input gear located at a power input end thereof and meshed with said main drive gear, a speed change gear set, said speed change gear set comprising a tachometer output sprocket located at an opposing output end thereof for driving a rear wheel of the electric motorcycle to rotate; the power transmission system further comprises a motor speed sensor mounted on said main drive gear of said main drive shaft and adapted for obtaining the data of the rotating speed of said electric motor, a vehicle speed sensor disposed at one side of one gear of said speed change gear set that is synchronized with said tachometer output sprocket and adapted for obtaining the data of the traveling speed of said electric motorcycle, and a pitch shifting pedal for controlling the desired gear shift position.

4. The electric motorcycle as claimed in claim 3, further comprising a battery for providing electricity to said electric motor and a speedometer and tachometer for respectively indicating the traveling speed of the electric motorcycle and the rotating speed of said electric motor, wherein said motor controller is adapted for detecting the load of said electric motor and the power volume of said battery and displaying the detected data through said speedometer and tachometer.

5. An electric motorcycle, comprising a power transmission system, said power transmission system comprising an electric motor, a motor controller adapted for controlling the operation of said electric motor, a gearbox, and a main drive shaft coupled between said electric motor and said gearbox, wherein said main drive shaft has one end thereof fixedly mounted with a belt gear and coupled to said electric motor through a transmission belt, and an opposite end thereof fixedly mounted with a main drive gear; said gearbox comprising a power input gear located at a power input end thereof and meshed with said main drive gear, a speed change gear set, said speed change gear set comprising a tachometer output sprocket located at an opposing output end thereof for driving a rear wheel of the electric motorcycle to rotate; the power transmission system further comprises a motor speed sensor mounted on said main drive gear of said main drive shaft and adapted for obtaining the data of the rotating speed of said electric motor, a vehicle speed sensor disposed at one side of one gear of said speed change gear set that is synchronized with said tachometer output sprocket and adapted for obtaining the data of the traveling speed of said electric motorcycle, a pitch shifting pedal for controlling the desired gear shift position, a control unit, said control unit comprising a MCU electrically coupled with said motor speed sensor and said vehicle speed sensor and adapted for converting the data of the rotating speed of said electric motor and the data of the traveling speed of said electric motorcycle and driving a speedometer and a tachometer to display the converted data, and a gear shift position sensor adapted for detecting the position of a gear shift position dial switch of a fork shaft to obtain the data of the gear shift position, the data of the gear shift position detected by said gear shift position sensor, the data of the turning degree of a speed twist grip of the electric motorcycle, the data of the rotating speed of said electric motor detected by said motor speed sensor and the data of the traveling speed of said electric motorcycle detected by said vehicle speed sensor being provided to said MCU of said control unit for computing so that said MCU provides a control signal to said motor controller for regulating the rotating speed of said electric motor to rotate said gearbox synchronously.

6. The electric motorcycle as claimed in claim 5, wherein said power transmission system further comprises a shifting motor control unit coupled to said MCU of said control unit, a shifting motor controllable by said shifting motor control unit, a shifting axle, a worm rotatable by said shifting motor, and a worm wheel mounted on said shifting axle and meshed with said worm.

* * * * *